United States Patent [19]

Baumbach

[11] 4,249,224
[45] Feb. 3, 1981

[54] SURGE VOLTAGE ARRESTER WITH FAIL-SAFE FEATURE

[75] Inventor: Bertram W. Baumbach, Arlington Heights, Ill.

[73] Assignee: Reliable Electric Company, Franklin Park, Ill.

[21] Appl. No.: 18,337

[22] Filed: Mar. 7, 1979

[51] Int. Cl.$^3$ .......................... H02H 3/22; H02H 9/04
[52] U.S. Cl. ....................................... 361/124; 337/28; 337/32; 337/33; 338/21; 361/127; 361/57
[58] Field of Search .............. 361/124, 127, 118, 119, 361/54, 55, 57, 103, 104, 106; 337/28, 31, 32, 33, 34, 15; 338/20, 21, 31

[56] References Cited

U.S. PATENT DOCUMENTS

| | | | |
|---|---|---|---|
| 3,755,715 | 8/1973 | Klayum et al. | 361/124 X |
| 3,879,696 | 4/1975 | Imajyo et al. | 338/21 X |
| 3,946,429 | 3/1976 | Kessler, Jr. | 361/104 X |
| 3,975,664 | 8/1976 | Baumbach | 361/124 |
| 4,002,952 | 1/1977 | Menninga | 361/124 |
| 4,015,228 | 3/1977 | Eda et al. | 337/28 |
| 4,068,281 | 1/1978 | Harnden, Jr. | 361/54 X |
| 4,168,514 | 9/1979 | Howell | 361/56 |

Primary Examiner—Patrick R. Salce
Attorney, Agent, or Firm—Trexler, Wolters, Bushnell & Fosse, Ltd.

[57] ABSTRACT

A surge voltage arrester utilizes for surge protection a varistor of the zinc oxide type between a line terminal and a ground terminal. The varistor is of a type that has a resistance which decreases as increasing voltage is applied thereacross. With increasing temperature the leakage current through the varistor increases at a given voltage. At a critical temperature and voltage condition, the varistor is subject to a thermal runaway condition which would cause the varistor to fail expelling hot particles. To avoid this failure condition, a fail-safe mechanism is provided which connects the line terminal to the ground terminal by-passing the varistor when there is an overcurrent condition on the line that results in heating of the varistor.

8 Claims, 5 Drawing Figures

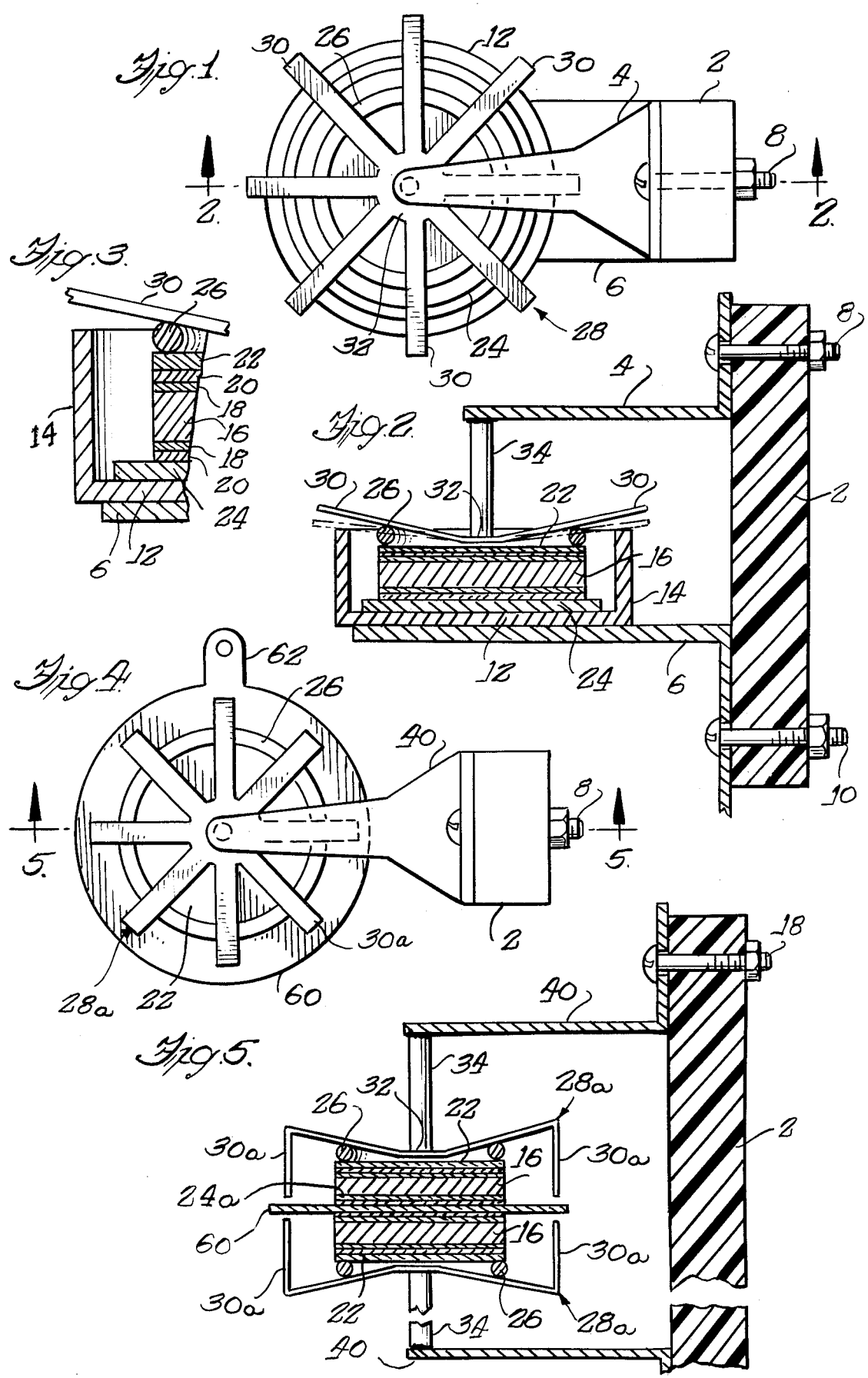

SURGE VOLTAGE ARRESTER WITH FAIL-SAFE FEATURE

BACKGROUND OF THE INVENTION

This invention relates to surge voltage arresters of the type primarily used for protecting telephone and like communication lines from overvoltage or overcurrent surges. The principles of the present invention are applicable to station protectors as well as to central office protectors. A typical central office protector is shown in U.S. Pat. No. 3,818,271, granted June 18, 1974 to Baumbach.

The use of varistors of the zinc oxide compound type in surge voltage arresters is broadly known as by reference to U.S. Pat. No. 4,092,694 to Stetson, granted May 30, 1978. Varistors of this type are non-linear voltage dependent resistances in which the resistance decreases as increasing voltage is applied across the varistor. Such varistors are also sensitive to heating. With increasing temperatures, the leakage current across the varistor increases at a given voltage. The increased leakage current further raises the temperature with the result that at a critical temperature and voltage condition, the varistor becomes subject to a thermal runaway condition and fails due to passing ever-increasing current. Upon failure generally a hole will develop in the varistor and hot particles will be expelled. Such a condition is obviously unsuitable for use in a central office line protector or in the proximity of other equipment because damage to such equipment and to personnel becomes possible.

The thermal runaway condition can be opposed by improving the heat transfer between the varistor and its supporting housing. However, the use of some form of improved thermal coupling may not be adequate to prevent thermal runaway under high surge voltage conditions of long duration, particularly if the surge voltage arrester is to be produced at reasonable costs.

OBJECTS AND SUMMARY OF THE INVENTION

An object of this invention is to provide a surge voltage arrester which utilizes a varistor of the type stated and can be embodied into a device with a fail-safe mechanism whereby the arrester unit may be utilized as a station or central office protector, or in other applications proximate to other telephone equipment.

A further object of this invention is to provide a surge voltage arrester of the type stated in which it is possible to provide for protection of currents up to about 450 amps utilizing 22 gauge AWG wire in the incoming line cable while preventing destruction of the varistor and the expulsion of hot particles therefrom at high surge currents.

A still further object of this invention is to provide a surge voltage arrester of the type stated that utilizes the advantages of a varistor in that the varistor fails "closed," that is by shorting to ground, in contrast to many gas tubes which fail open with a loss of gas.

In carrying out the foregoing objects the surge voltage arrester comprises a line terminal adapted for connection to a line to be protected, a ground terminal, means forming an electrical first circuit between said terminals that is substantially non-conducting for line voltages below a predetermined value but becomes substantially conducting to arrest surge voltages on the line above said predetermined value, said first circuit including circuit component means having a resistance that decreases as increasing voltage is applied thereacross and which heats excessively in an overcurrent condition in a protected line, a normally open second electrical circuit between said terminals and including a pair of contactors electrically connected respectively to said terminals, means applying pressure tending to bring said contactors into engagement, and heat-deformable means operable in opposition to said pressure-applying means to maintain said contactors apart, said heat-deformable means deforming sufficiently upon excessive heating of said component means to cause said contactors to engage so that said second circuit closes and provides a direct conductive path between said terminals.

The varistor is formed of a zinc oxide ceramic varistor compound and is further characterized in that it passes increasing current for a given voltage upon increasing temperature. Also, the varistor is typically a disc-shaped component having opposed faces and wherein this invention uses copper plates disposed against those opposite surfaces to provide heat sinks to transfer heat away from the varistor. It has been found that this heat tends to migrate toward the perimeters of the copper plates and for that reason the heat deformable or fusible means, which may be of low melting point solder, is disposed in the peripheral region of one of the copper plates.

BRIEF DESCRIPTION OF THE FIGURES

FIG. 1 is a top plan view of a surge voltage arrester constructed in accordance with and embodying the present invention;

FIG. 2 is a sectional view taken along line 2—2 of FIG. 1;

FIG. 3 is an enlarged portion of FIG. 2;

FIG. 4 is a top plan view of a modified form of a surge voltage arrester embodying the invention; and FIG. 5 is a sectional view taken along line 5—5 of FIG. 4.

DETAILED DESCRIPTION

Referring now in more detail to the drawing, particularly to FIGS. 1-3, there is shown a surge voltage arrester comprising an insulator 2 which serves as a mounting or support for the arrester. Secured to the insulator 2 at spaced regions therealong is a metallic line terminal 4 and a metallic ground terminal 6. The line terminal 4 and the ground terminal 6 are suitably secured respectively as by screws and nuts 8, 10 to the insulator 2. The line or central office equipment to be protected is wire-connected to the screw 8 whereas the screw 10 is connected to ground in any suitable fashion.

In the form of the invention shown, the ground terminal 6 is in the form of an angle-shaped bracket that has a part that projects away from the insulator 2 for supporting an annular brass cup or shell 12. The base of cup 12 rests upon the ground terminal 6. The annular sidewall 14 of the cup 12 projects toward the line terminal 4.

Disposed within the cup 12 is an assemblage that includes a varistor 16 of the zinc oxide ceramic type. Typically, the varistor may be of a known type designated as V250LA40 and manufactured by the General Electric Company, Pittsfield, Mass., U.S.A. The varistor 16 is approximately 0.120 inches thick with metalized opposed faces 18, 18 that serve as contacts. The varistor 16 may be a single unitary circuit component, but it should be recognized that such a component may consist of a plurality of face-to-face or "stacked" varistors in series. In any event, the faces 18, 18 of the varistor 16 have solder films 20, 20 onto which are soldered copper discs or plates 22, 24. The copper plate 24 abuts the bottom surface of the shell 12 and is slightly smaller in diameter than the internal diameter of the shell sidewall 14 so as to fit loosely within the shell 12. The other copper plate 22 is approximately the same diameter as that of the varistor 16.

The copper discs 22, 24 serve as heat sinks to delay the tendency to destruction that takes place in the varistor component 16 during high leakage current conditions through the varistor. It has also been found that the copper discs 22, 24 tend to force hot spots formed in the varistor during high current overloads to move toward the peripheral parts of the copper plates 22, 24. A heat-deformable ring 26 of low melting point solder rests on the copper disc 22 and is of a diameter such that the ring 26 is adjacent to the peripheral part of the copper disc 22. Thus, under high current overloads against which protection is sought, the solder ring 26 will melt in the region of the hot spots allowing one or more of the hereinafter described multiple fingers to provide a conductive path to ground.

Disposed against the solder ring 26 is a spider 28 of spring brass or the like. The spider 28 has multiple spring fingers 30 which radiate from a center part 32. The spider 28 is normally flat but may be spring biased to the condition shown in FIG. 2 under axial pressure against the center 32. This axial pressure may be applied through a rod 34 that is soldered or is otherwise joined to an end of the line terminal 4. Thus, with the varistor 16 and copper plates 22, 24 placed within the shell 12, the solder ring 26 may be positioned on the copper plate 22. The spider 28 may then be positioned over the open end of the shell until the fingers 30 of the spider seat on the solder ring 26. When the line terminal 4 is attached to the insulator 2 by the screw 8, the rod 34 will be in such position as to apply axial force against the spider center 32 depressing it inwardly toward the copper plate 22 and pressing the fingers 30 firmly against the solder ring 26. The tip portions of the finger will angle upwardly and will be spaced from the rim of the cup sidewall 14 as shown in FIG. 3 and in full lines in FIG. 2. Thus, the fail-safe circuit will be open during normal conditions of operation.

A high surge voltage of short duration and low current appearing at the line terminal 4 will be conducted to ground through a circuit including the varistor 16 and the ground terminal 24. Under such conditions the arrester is self-restoring for further protection. However, the device is also a line protector under abnormally high current overloads. Thus, the heat from the varistor 16 will be transmitted through the copper plate 22 to the solder ring 26 causing the solder ring 26 to deform or melt at least in the regions of the hot spots on the plate 22. All of the spring fingers 30 are then no longer opposed by the solder 26. Thus, one or more of the spring fingers 30 and the rim of the sidewall 14 will contact each other, as shown in broken lines in FIG. 2, to provide a direct conductive circuit or path from the line terminal 4 to the ground terminal 6. Which of the fingers 30 provides the conductive path to ground may depend upon the location of the hot spot or spots. The heat transferred by the copper discs 22, 24 away from the varistor 16 helps control thermal runaway. Also, the fact that the solder ring 26 is at the peripheral region of the copper disc 22 assists in rapid melting of the solder ring 26 under high current conditions. This actuates the fail-safe circuit to ground the line terminal 6 before a thermal runaway has caused eruption of the varistor or the expulsion of hot particles therefrom.

FIGS. 4 and 5 show an arrangement in which two varistor type assemblies may provide an arrester that results in protection from each of two line terminals 40, 40. The parts in FIGS. 4 and 5 that are similar to the parts in FIGS. 1-3 are designated with like reference numerals. One terminal may be connected to each side (tip and ring) of the line. However, the copper plate 24a may be of substantially the same diameter as the remainder of the varistor assembly, which is otherwise the same as in FIGS. 1-3. The ground contactor 60 may include a tab or terminal 62 at which the contactor 40 may be grounded. A varistor 16 and its assembled copper plates is disposed on each side of the ground contactor 60. Each resilient brass spider 28a, 28a has its fingers 30a, 30a somewhat longer than the fingers 30 of FIGS. 1-3. These spring loaded fingers 30a are bent to project toward the contactor 60 with the ends of the fingers 30a normally held spaced therefrom by the solder rings 26, 26 as shown in FIG. 5. However, upon deforming or melting of one of the solder rings 26, one or more of the associated fingers 30a will move toward the contactor 60 and into engagement with contactor 60 to ground the associated line.

By way of example but not of limitation, the copper discs 22, 24 may be 0.031 inches thick, the spring brass spider 28 may be 0.016 inches thick and the brass cup or shell 12 may be 0.040 inches thick. A nominal outside diameter for the brass cup is about 1 inch. The solder films 20, 20 embody solder that melts at approximately 360° F. On the other hand, the solder ring 26 may utilize solder that melts at 204° F. and may be in the form of a wire whose diameter is approximately 0.061 inches.

This invention is claimed as follows:

1. A surge voltage arrester for a communications line comprising a line terminal adapted for connection to a line to be protected, a ground terminal, means forming a first electrical circuit between said terminals that is substantially non-conductive for line voltages below a predetermined value but becomes substantially conductive to arrest surge voltages on the line above said predetermined value, said first circuit including circuit component means having a resistance that decreases as increasing voltage is applied thereacross and which heats excessively in an overcurrent condition in the protected line, said component means being further characterized as passing increased current for a given voltage upon increased temperature, a normally-open second electrical circuit coupled between said terminals and including a pair of contactors electrically connected respectively to said terminals, means applying pressure tending to bring said contactors into engagement, and heat-deformable means operable in opposition to said pressure-applying means to maintain said contactors apart, said heat-deformable means deforming sufficiently upon heating of said component means to cause said contactors to engage so that said second circuit closes and provides a direct conductive path between said terminals.

2. A surge voltage arrester according to claim 1 in which said component means comprises a varistor formed of a zinc oxide varistor compound.

3. A surge voltage arrester according to claim 1 in which said component means comprises a structure having opposed faces, at least one of said faces being in thermally conductive connection with a member that has a thermal conductivity substantially that of copper and having a region at the peripheral part of said member, said heat-deformable means being substantially of said region.

4. A surge voltage arrester according to claim 1 in which said component means comprises a structure having opposed faces, and means forming heat sinks on said faces, one of said heat sinks transferring heat from the component means to said heat-deformable means.

5. A surge voltage arrester according to claim 4 in which one of said contactors is a receptacle that contains an assembly comprising said component means and said heat sinks.

6. A surge voltage arrester according to claim 1 including an additional line terminal, a third circuit similar to said first circuit and between said additional terminal and said ground terminal, the component means of the respective first and third circuit being on opposite sides of said ground terminal.

7. A surge voltage arrester comprising a line terminal adapted for connection to a line to be protected, a ground terminal, means forming a first electrical circuit between said terminals that is substantially non-conductive for line voltages below a predetermined value but becomes substantially conductive to arrest surge voltages on the line above said predetermined value, said first circuit including a varistor that passes increased current for a given voltage upon increased temperature and which is capable of heating to a thermal runaway condition in an overcurrent condition in the protected line, a normally-open second electrical circuit coupled between said terminals and including a pair of contactors electrically connected respectively to said terminals, means applying pressure tending to bring said contactors into engagement, and heat-deformable means operable in opposition to said pressure-applying means to maintain said contactors apart, said heat-deformable means being in thermal conducting relation to said varistor, said heat-deformable means deforming sufficiently upon heating of said varistor in said overcurrent condition to cause said contactors to engage so that said second circuit closes and provides a direct conductive path between said terminals.

8. A line protector comprising a line terminal and a ground terminal, a first electrical circuit from the line terminal to the ground terminal and having varistor means heatable in the event of an overcurrent condition on the line, a normally open second circuit coupled between said terminals and including heat sink means in thermally conductive relation with said heatable varistor means for producing one or more hot spots in said heat sink means in said overcurrent condition, spring loaded contactor means in said second circuit having multiple fingers tending to close said contactor means and thereby close said normally open second circuit, and means normally preventing said contactor means from closing and being heat deformable at least in the region of a hot spot such that one or more of said fingers closes said second circuit depending upon the hot spot location.

* * * * *